(12) United States Patent
Lee et al.

(10) Patent No.: US 9,927,597 B2
(45) Date of Patent: Mar. 27, 2018

(54) PHOTOGRAPHIC LENS AND PHOTOGRAPHIC APPARATUS INCLUDING THE SAME

(71) Applicant: KOLEN CO., LTD., Gyeonggi-do (KR)

(72) Inventors: Jong Jin Lee, Seol (KR); Chan Goo Kang, Gyeonggi-do (KR)

(73) Assignee: KOLEN CO., LTD., Gyeonggi-do (KR)

( * ) Notice: Subject to any disclaimer, the term of this patent is extended or adjusted under 35 U.S.C. 154(b) by 0 days.

(21) Appl. No.: 15/009,382

(22) Filed: Jan. 28, 2016

(65) Prior Publication Data

US 2016/0223796 A1    Aug. 4, 2016

(30) Foreign Application Priority Data

Jan. 30, 2015 (KR) .................... 10-2015-0015569

(51) Int. Cl.
*G02B 13/00* (2006.01)
*G02B 9/62* (2006.01)

(52) U.S. Cl.
CPC .......... *G02B 13/0045* (2013.01); *G02B 9/62* (2013.01)

(58) Field of Classification Search
CPC .............................. G02B 13/0045; G02B 9/62
See application file for complete search history.

(56) References Cited

U.S. PATENT DOCUMENTS

| | | | |
|---|---|---|---|
| 8,385,008 B2 | 2/2013 | Hsieh et al. | |
| 8,456,763 B2 | 6/2013 | Hsieh et al. | |
| 2012/0307382 A1 | 12/2012 | Hsu et al. | |
| 2015/0346461 A1* | 12/2015 | Chen ................ | G02B 13/18 348/373 |

FOREIGN PATENT DOCUMENTS

| | | |
|---|---|---|
| CN | 102540411 A | 7/2012 |
| CN | 102645728 B | 6/2014 |
| CN | 104238074 A | 12/2014 |

OTHER PUBLICATIONS

Chinese Office Action dated Nov. 1, 2017, issued in corresponding Chinese Patent Application No. 201610064849.4, (6 pages).

* cited by examiner

*Primary Examiner* — Joseph P Martinez
(74) *Attorney, Agent, or Firm* — Fitch Even Tabin & Flannery LLP

(57) ABSTRACT

A photographic lens includes, in a sequence from an object to an image plane, a first lens having positive or negative refractive power; a second lens having positive or negative refractive power; a third lens having positive refractive power; a fourth lens having negative refractive power; a fifth lens having positive refractive power; and a sixth lens having negative refractive power. The photographic lens satisfies the following condition:

$$90° < FOV < 160°$$

$$0.5 < D1/D6 < 1.0$$

where FOV is a field of view of the photographic lens, D1 is an effective aperture of the first lens, and D2 is an effective aperture of the sixth lens.

6 Claims, 20 Drawing Sheets

PHOTOGRAPHIC LENS AND PHOTOGRAPHIC APPARATUS INCLUDING THE SAME

CROSS-REFERENCE TO RELATED APPLICATIONS

This application claims the benefit of Korean Patent Application No. 10-2015-0015569 filed on Jan. 30, 2015, in the Korean Intellectual Property Office, the disclosure of which is incorporated herein in its entirety by reference.

BACKGROUND

1. Field

One or more exemplary embodiments relate to photographic lenses, and more particularly, to a compact photographic lens having a high optical performance that is designed to be suitable for mobile phone cameras.

2. Description of the Related Art

Recently, the use of cameras including solid-state imaging devices such as charge coupled devices (CCDs) or complementary metal oxide semiconductor (CMOS) image sensors has been rapidly increasing.

The pixel integration density of solid-state imaging devices has increased to improve the resolution of cameras. Along with this, small and lightweight cameras have been developed by improving the performance of photographic lenses included in the cameras. Photographing apparatuses using solid-state imaging devices are suitable for miniaturization, and thus have recently been applied to mobile apparatuses such as smartphones.

In general, many lenses are used to secure an optical performance. However, the use of many lenses adversely affects miniaturization, weight lightening, and price competitiveness of cameras. When a small number of lenses are used, miniaturization and price competitiveness of cameras improve, but aberration correction may not be enough.

Moreover, as the professionalism of consumers for cameras has recently continuously increased, a design that accomplishes an optical performance suitable for purposes together with miniaturization has been requested. Thus, there is a demand for photographic lenses designed to accomplish miniaturization, weight lightening, and cost reduction while obtaining a desired performance.

SUMMARY

One or more exemplary embodiments include a photographic lens that is favorable for miniaturization/weight lightening and has good performance.

Additional aspects will be set forth in part in the description which follows and, in part, will be apparent from the description, or may be learned by practice of the presented embodiments.

According to an aspect of the present invention, a photographic lens includes, in a sequence from an object to an image plane, a first lens having positive or negative refractive power; a second lens having positive or negative refractive power; a third lens having positive refractive power; a fourth lens having negative refractive power; a fifth lens having positive refractive power; and a sixth lens having negative refractive power, wherein the zoom lens satisfies the following condition:

$$90°<FOV<160°$$

$$0.5<D1/D6<1.0$$

where FOV is a field of view of the photographic lens, D1 is an effective aperture of the first lens, and D6 is an effective aperture of the sixth lens.

The photographic lens may satisfy the following condition:

$$0.0<|F1/F2|<10.0$$

where F1 and F2 are a focal length of the first lens and a focal length of the second lens, respectively.

The photographic lens may satisfy the following condition:

$$1.5<Ind2<1.7$$

where Ind2 is a refractive index of the second lens.

The photographic lens may satisfy the following condition:

$$125°<FOV<160°$$

where FOV is a field of view of the photographic lens.

The first lens may have negative refractive power.

The photographic lens may satisfy the following condition:

$$0<|F1/F2|<1.5$$

where F1 and F2 are a focal length of the first lens and a focal length of the second lens, respectively.

The first lens may have positive refractive power.

The photographic lens may satisfy the following condition:

$$3.5<|F1/F2|<8.5$$

where F1 and F2 are a focal length of the first lens and a focal length of the second lens, respectively.

According to an aspect of the present invention, a photographic lens includes, in a sequence from an object to an image plane, a first lens having positive or negative refractive power; a second lens having positive or negative refractive power; a third lens having positive refractive power and shaped such that an exit surface is convex toward the image plane; a fourth lens having negative refractive power and shaped such that an entrance surface is concave toward the object; a fifth lens having positive refractive power and shaped such that an exit surface is convex toward the image plane; and a sixth lens having negative refractive power and an aspherical shape in which an exit surface has at least one inflection point. The photographic lens satisfies the following condition:

$$125°<FOV<160°$$

where FOV is a field of view of the photographic lens.

The photographic lens may satisfy the following condition:

$$0.5<D1/D6<1.0$$

where D1 is an effective aperture of the first lens and D6 is an effective aperture of the sixth lens.

The photographic lens may satisfy the following condition:

$$0.0<|F1/F2|<10.0$$

where F1 and F2 are a focal length of the first lens and a focal length of the second lens, respectively.

The first lens may have negative refractive power.

The photographic lens may satisfy the following condition:

$$0<|F1/F2|<1.5$$

where F1 and F2 are a focal length of the first lens and a focal length of the second lens, respectively.

The first lens may have positive refractive power.

The photographic lens may satisfy the following condition:

$$3.5<|F1/F2|<8.5$$

where F1 and F2 are a focal length of the first lens and a focal length of the second lens, respectively.

All of the first lens through the sixth lens may be aspherical plastic lenses.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
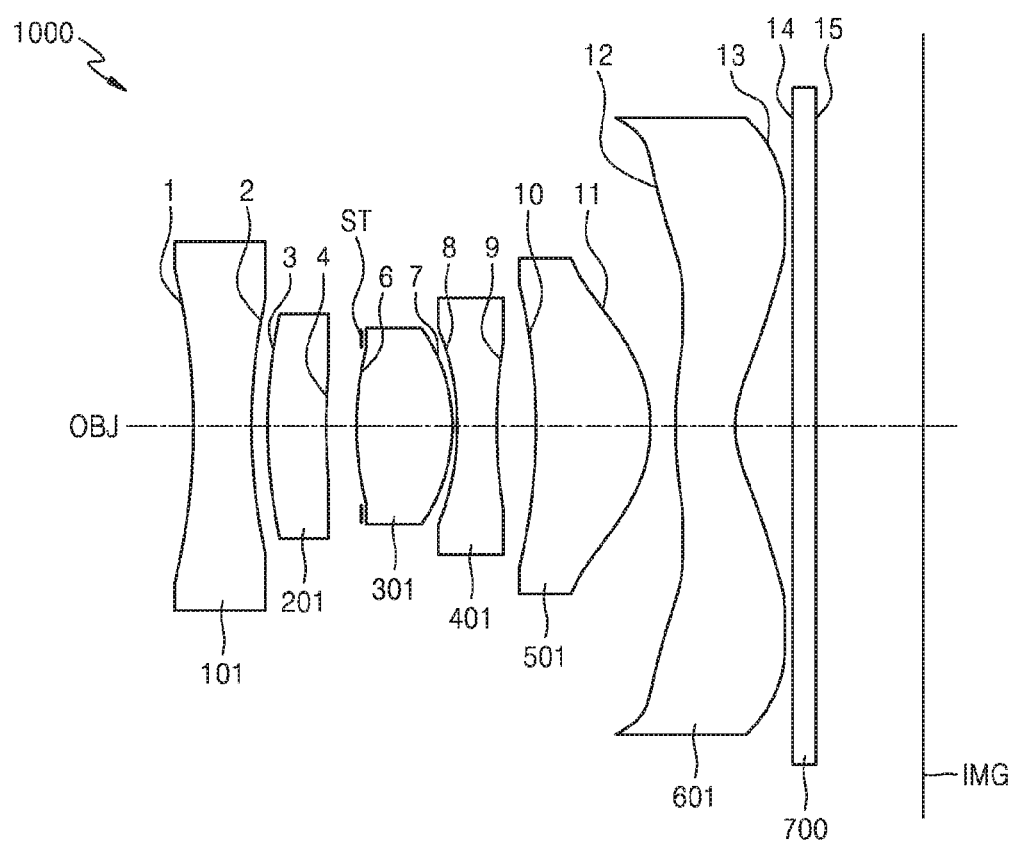
FIG. 1 is a cross-sectional view illustrating an optical arrangement of a photographic lens according to an embodiment.

Exemplary embodiments of the present invention will now be described more fully with reference to the accompanying drawings. Like reference numerals in the drawings denote like elements, and sizes of components in the drawings may be exaggerated for clarity and convenience of explanation.

FIG. 1 illustrates an optical arrangement of a photographic lens 1000 according to an embodiment.

Referring to FIG. 1, the photographic lens 1000 includes a first lens 101 having negative refractive power, a second lens 201 having positive refractive power, a third lens 301 having positive refractive power, a fourth lens 401 having negative refractive power, a fifth lens 501 having positive refractive power, and a sixth lens 601 having negative refractive power, which are sequentially arranged in a direction from an object OBJ to an image plane IMG.

The lenses that constitute the photographic lens 1000 achieve miniaturization, weight lightening, and a wide angle, and are shaped such that they may achieve smooth aberration correction.

The photographic lens 1000 may satisfy the following conditions:

$$90°<FOV<160° \tag{1}$$

where FOV is a field of view of the photographic lens 1000.

According to Condition (1), a super wide angle of view is accomplished.

Condition (1) may be modified into Condition (1-1), and Condition (1-1) may be used.

$$125°<FOV<160° \tag{1-1}$$

The photographic lens 1000 may satisfy Condition (2):

$$0.5<D1/D6<1.0 \tag{2}$$

where D1 is an effective aperture of the first lens 101 and D6 is an effective aperture of the sixth lens 601.

Condition (2) defines a ratio between the effective apertures of the first lens 101 and the sixth lens 601. In general optical systems accomplishing a wide angle, a lens closest to an object side has a largest effective aperture in many cases. Thus, the general optical systems enlarge. However, the present embodiment proposes a structure favorable to miniaturization by setting the first lens 101 to have a smaller effective aperture than the sixth lens 106.

When the ratio deviates from a lower limit of Condition (2), a compact optical system is obtained, but a wide angle is not accomplished. When the ratio deviates from an upper limit of Condition (2), a wide angle performance is accomplished, but a compact optical system is not obtained.

The photographic lens 1000 may satisfy the following conditions:

$$0.0 < |F1/F2| < 10.0 \quad (3)$$

where F1 and F2 are a focal length of the first lens 101 and a focal length of the second lens 201, respectively.

Condition (3) defines a ratio between the focal lengths of the first lens 101 and the second lens 201, namely, defines a refractive power distribution.

Within the range of Condition (3), wide angle accomplishment and aberration correction may satisfy an optimal requirement. However, when the ratio deviates from the range of Condition (3), aberration control is difficult, and optimizing an optical system is difficult.

Condition (3) may be modified into Condition (3-1), and Condition (3-1) may be used.

$$0 < |F1/F2| < 1.5 \quad (3\text{-}1)$$

Figure 11:
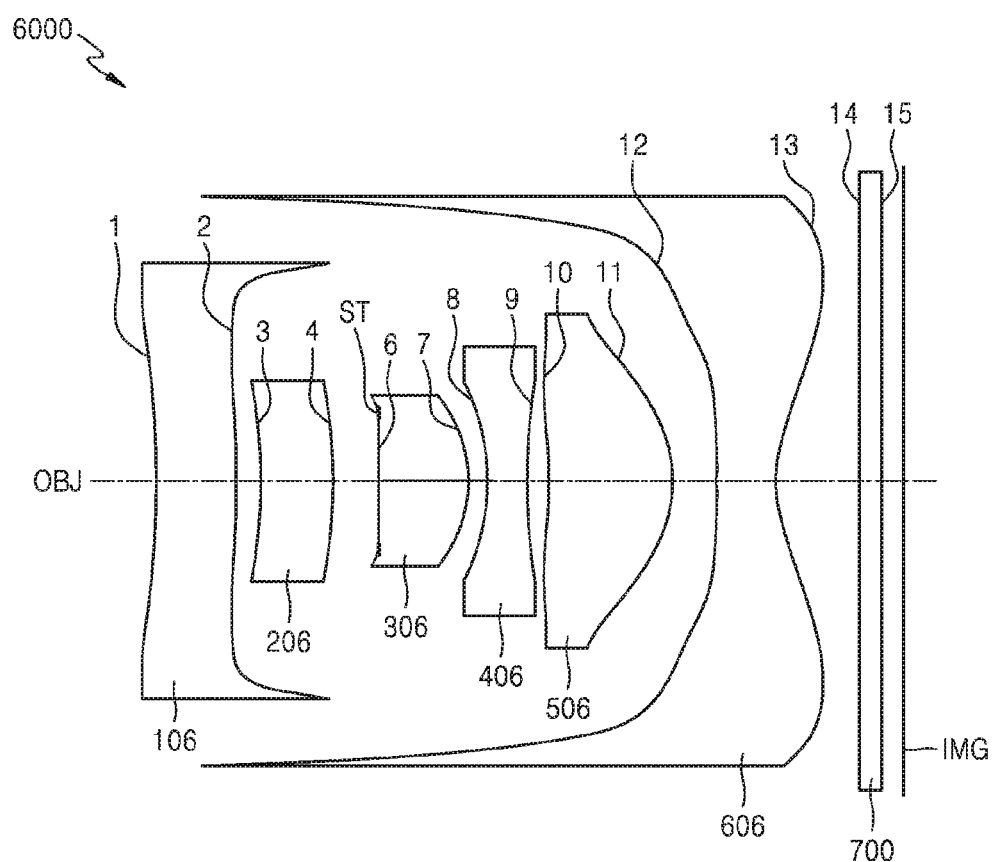
FIG. 11 is a cross-sectional view illustrating an optical arrangement of a photographic lens according to another embodiment.
Figure 13:
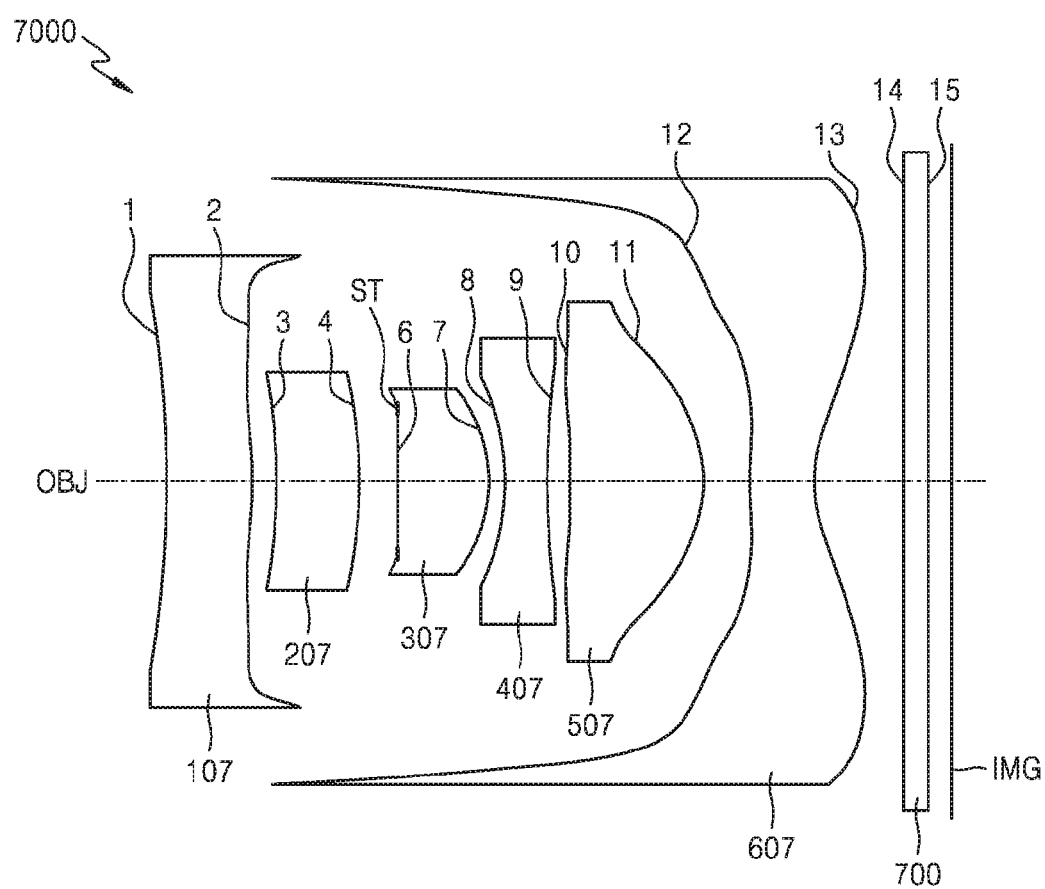
FIG. 13 is a cross-sectional view illustrating an optical arrangement of a photographic lens according to another embodiment.

For example, a first lens 106 according to Embodiment 6 of FIG. 11 and a first lens 107 according to Embodiment 7 of FIG. 13 may each have positive refractive power. In this case, Condition (3) may be modified into Condition (3-2), and Condition (3-2) may be used.

$$3.5 < |F1/F2| < 8.5 \quad (3\text{-}2)$$

The photographic lens 1000 may satisfy Condition (4):

$$1.5 < \text{Ind2} < 1.7 \quad (4)$$

where Ind2 is a refractive index of the second lens 201.

Condition (4) defines the refractive index of the second lens 201, and the refractive index has a numeric range that facilitates forming of the second lens 201 using a low-priced plastic material. In general, a glass material has a larger refractive index than a plastic material, but is heavier and more costly than the plastic material. A lens shaping condition of the glass material is stricter than that of the plastic material. By obtaining desired refractive power by using a material that satisfies Condition (4), weight lightening, manufacture easiness, and cost reduction may be achieved.

The other lenses, namely, the first lens 101 and the third through sixth lens 301 through 601, may be designed to satisfy Condition (4), and thus weight lightening and cost reduction may be more effectively achieved.

A detailed shape of each lens included in the photographic lens 1000 will now be described in detail. Hereinafter, an object side surface of each lens is referred to as an entrance surface, and an image side surface thereof is referred to as an exit surface.

The first lens 101 has negative refractive power, and thus may have a biconcave shape.

The second lens 201 has positive refractive power, and may have a shape in which an entrance surface is convex toward the object OBJ.

The third lens 301 has positive refractive power, and may have a shape in which an exit surface is convex toward the image plane IMG, for example, may have a biconvex shape.

The fourth lens 401 has negative refractive power, and may have a shape in which an entrance surface is concave toward the object OBJ. For example, the fourth lens 401 may be a biconcave lens.

The fifth lens 501 has positive refractive power, and may have a shape in which an exit surface is convex toward the image plane IMG. For example, the fifth lens 501 may be a meniscus lens that is convex toward the image plane IMG.

The sixth lens 601 has negative refractive power, and may have an aspherical shape in which an exit surface has at least one inflection point.

A stop ST may be disposed between the second lens 201 and the third lens 301, but the location of the stop ST is not limited thereto.

An infrared ray block filter 700 may be disposed between the sixth lens 106 and the image plane IMG. However, embodiments are not limited thereto, and the infrared ray blocking filter 700 may be omitted. Alternatively, both or one of the infrared ray blocking filter 700 and a cover glass may be disposed.

An image sensor (not shown), such as a charge coupled device (CCD) or a complementary metal-oxide semiconductor (CMOS), is disposed on the image plane IMG.

The first lens 101 through the sixth lens 601 may be formed of a glass material or a plastic material. However, at least one of the first through sixth lenses 101 through 601 may be formed of a plastic material to achieve weight lightening. To achieve aberration correction, at least one of the first through sixth lenses 101 through 601 may employ an aspherical surface as at least one surface. In this case, the at least one lens employing an aspherical surface may be formed of a plastic material to achieve process easiness. All of the first through sixth lenses 101 through 601 may be implemented as aspherical plastic lenses in order to achieve aberration correction, weight lightening, and cost reduction.

Lens data according to several embodiments of the present invention will now be described in detail. In the lens data, ST indicates a stop, and an indication * behind a surface numeral indicates that a corresponding surface is aspherical. In the lens data, R, T, Nd, and Vd indicate the radius of curvature, a thickness or interval, a refractive index, and an Abbe's number, respectively. In the lens data, Fno. indicates the number of F, and f indicates a focal length. The units of the focal length, the radius of curvature, and the thickness or interval are each mm.

The aspherical surface is defined as follows.

$$Z = \frac{Y^2}{R\left(1 + \sqrt{1 - (1+K)Y^2/R^2}\right)} + AY^4 + BY^6 + CY^6 + DY^{10} \quad [\text{Equation 1}]$$

where Z denotes a distance from a vertex of a lens along an optical axis, Y denotes a distance from the vertex of the lens in a direction perpendicular to the optical axis, K denotes a conic constant, A, B, C, and D denote aspherical coefficients, and R denotes the radius of curvature of the vertex of the lens.

Embodiment 1

FIG. 1 illustrates an optical arrangement of the photographic lens 1000 according to Embodiment 1, and lens data according to Embodiment 1 is as follows.

TABLE 1

| FNo. = 2.4/f = 1.650 mm | | | | |
|---|---|---|---|---|
| Surface | R | T | Nd | Vd |
| 1* | −1.5216 | 0.3 | 1.546 | 56.093 |
| 2* | 8.7162 | 0.0792 | | |
| 3* | 1.6455 | 0.2905 | 1.646 | 23.517 |
| 4* | 4.6824 | 0.1766 | | |
| ST | Infinity | −0.0192 | | |
| 6* | 1.8654 | 0.468 | 1.546 | 56.093 |
| 7* | −1.0598 | 0.0325 | | |
| 8* | −4.1417 | 0.2 | 1.646 | 23.517 |

TABLE 1-continued

FNo. = 2.4/f = 1.650 mm

| Surface | R | T | Nd | Vd |
|---|---|---|---|---|
| 9* | 2.213 | 0.1888 | | |
| 10* | −2.1632 | 0.575 | 1.546 | 56.093 |
| 11* | −0.5954 | 0.1265 | | |
| 12* | 1.2898 | 0.3 | 1.546 | 56.093 |
| 13 | 0.4952 | 0.29 | | |
| 14 | Infinity | 0.11 | | |
| 15 | Infinity | 0.5503 | | |
| IMG | Infinity | −0.0123 | | |

Table 2 below shows an aspherical coefficient.

TABLE 2

| Surface | K | A | B | C | D |
|---|---|---|---|---|---|
| 1 | −16.6006 | 0.1524 | −0.1195 | 0.0867 | −0.0437 |
| 2 | 0 | 0.3432 | −0.4669 | 0.5604 | 1.9329 |
| 3 | −14.0741 | −0.14 | −0.9501 | 3.3987 | −3.2752 |
| 4 | 0 | −0.3024 | 0.4438 | −4.0996 | 18.3521 |
| 5 | 12.7658 | −0.1237 | −3.4767 | 15.0715 | −68.0161 |
| 6 | −4.8752 | −0.9096 | −0.9708 | 4.8801 | −11.9516 |
| 7 | 52.0933 | −0.9756 | −2.4862 | 11.815 | −6.7214 |
| 8 | 2.2417 | −0.4969 | −0.6014 | 3.315 | −4.4648 |
| 9 | −11.7298 | 0.1865 | −0.1371 | −0.3945 | 0.0112 |
| 10 | −0.8105 | 0.6092 | −0.733 | 1.0616 | −0.3284 |
| 11 | −34.4079 | −0.2414 | 0.0168 | 0.0552 | −0.0013 |
| 12 | −4.6207 | −0.2609 | 0.1947 | −0.125 | 0.0443 |

Figure 2:
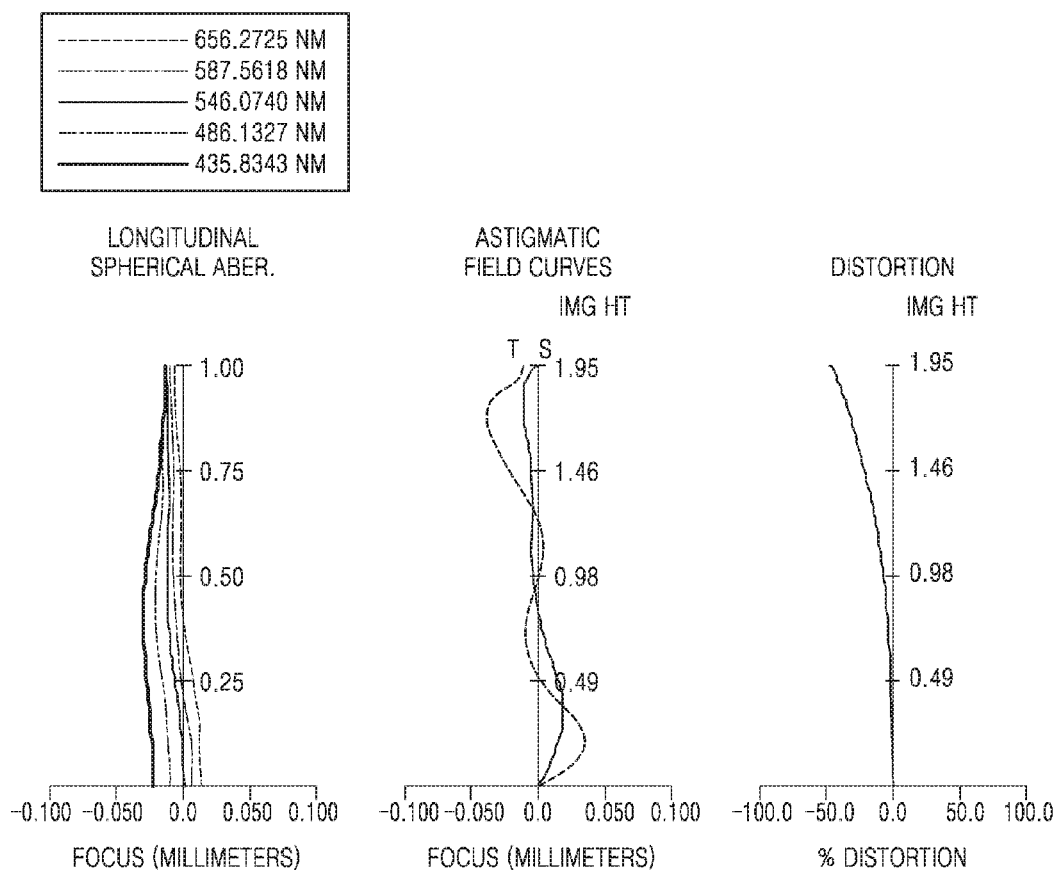
FIG. 2 illustrates a longitudinal spherical aberration, astigmatic field curves, and distortion of the photographic lens according to the embodiment of FIG. 1.

FIG. 2 illustrates a longitudinal spherical aberration, astigmatic field curves, and distortion of a photographic lens optical system according to Embodiment 1. Longitudinal spherical aberrations are shown for light beams having wavelengths of 656.2725 (nm), 587.5618 (nm), 546.0740 (nm), 486.1327 (nm), and 435.8343 (nm), respectively, and astigmatic field curves and distortion are shown for the light beam having a wavelength of 546.0740 (nm). In an astigmatic field curve graph, a sagittal field curvature and a tangential field curvature are indicated by S and T, respectively.

Embodiment 2

Figure 3:
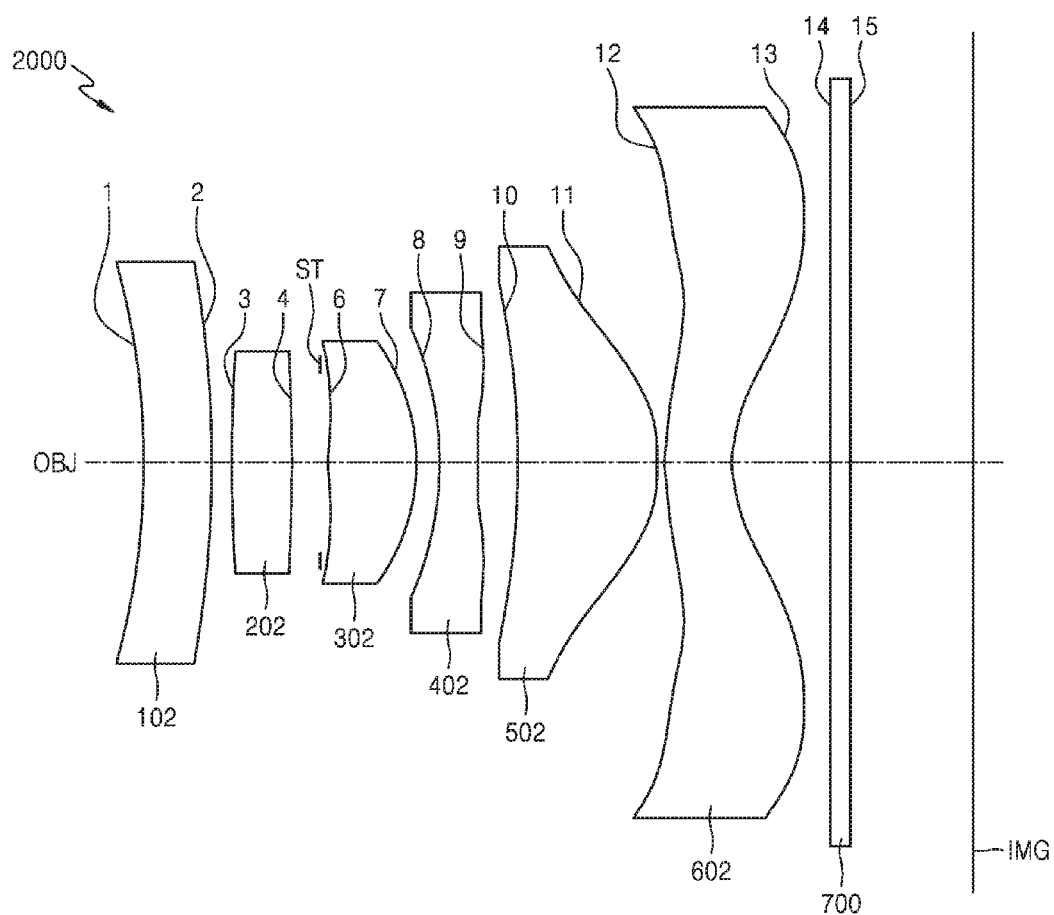
FIG. 3 is a cross-sectional view illustrating an optical arrangement of a photographic lens according to another embodiment.

FIG. 3 illustrates an optical arrangement of a photographic lens 2000 according to Embodiment 2.

Referring to FIG. 3, the photographic lens 2000 includes a first lens 102 having negative refractive power, a second lens 202 having positive refractive power, a third lens 302 having positive refractive power, a fourth lens 402 having negative refractive power, a fifth lens 502 having positive refractive power, and a sixth lens 602 having negative refractive power, which are sequentially arranged in a direction from the object OBJ to the image plane IMG.

Lens data according to Embodiment 2 is as follows.

TABLE 3

FNo. = 2.4/f = 2.0610 mm

| Surface | R | T | Nd | Vd |
|---|---|---|---|---|
| 1* | −1.8902 | 0.3500 | 1.547 | 56.071 |
| 2* | −3.2311 | 0.1065 | | |
| 3* | 3.6296 | 0.3000 | 1.547 | 56.071 |
| 4* | 11.7903 | 0.1521 | | |
| ST | Infinity | 0.0474 | | |
| 6* | 5.2431 | 0.4551 | 1.547 | 56.071 |
| 7* | −1.4250 | 0.1157 | | |

TABLE 3-continued

FNo. = 2.4/f = 2.0610 mm

| Surface | R | T | Nd | Vd |
|---|---|---|---|---|
| 8* | −5.0445 | 0.2000 | 1.658 | 21.521 |
| 9* | 3.1008 | 0.2026 | | |
| 10* | −3.5340 | 0.7306 | 1.547 | 56.071 |
| 11* | −0.6906 | 0.0400 | | |
| 12* | 1.1653 | 0.3500 | 1.538 | 55.801 |
| 13* | 0.4909 | 0.5000 | | |
| 14 | Infinity | 0.1100 | | |
| 15 | Infinity | 0.6235 | | |
| IMG | Infinity | 0.0165 | | |

Table 4 below shows an aspherical coefficient.

TABLE 4

| Surface | K | A | B | C | D |
|---|---|---|---|---|---|
| 1 | −12.8272 | 0.0742 | −0.0643 | 0.0345 | −0.0106 |
| 2 | −84.1796 | 0.0974 | −0.1284 | 0.0126 | 0.1046 |
| 3 | −9.0801 | −0.1158 | −0.6669 | 0.9187 | −0.2433 |
| 4 | −179.0765 | −0.2835 | −0.0043 | −0.6189 | 3.4027 |
| 5 | 69.1942 | −0.2313 | −0.5747 | 0.0524 | −3.1112 |
| 6 | −10.1624 | −0.5547 | −0.4204 | 1.1669 | −1.608 |
| 7 | 36.2071 | −0.3239 | −1.3277 | 3.5441 | −1.6502 |
| 8 | 4.7388 | −0.2442 | −0.351 | 1.1065 | −1.3174 |
| 9 | −4.5079 | 0.1278 | −0.0744 | −0.0766 | 0.066 |
| 10 | −0.7919 | 0.461 | −0.4836 | 0.4223 | −0.0614 |
| 11 | −15.5311 | −0.1663 | 0.0434 | 0.0056 | −0.0017 |
| 12 | −3.83 | −0.177 | 0.1048 | −0.0458 | 0.011 |

Figure 4:
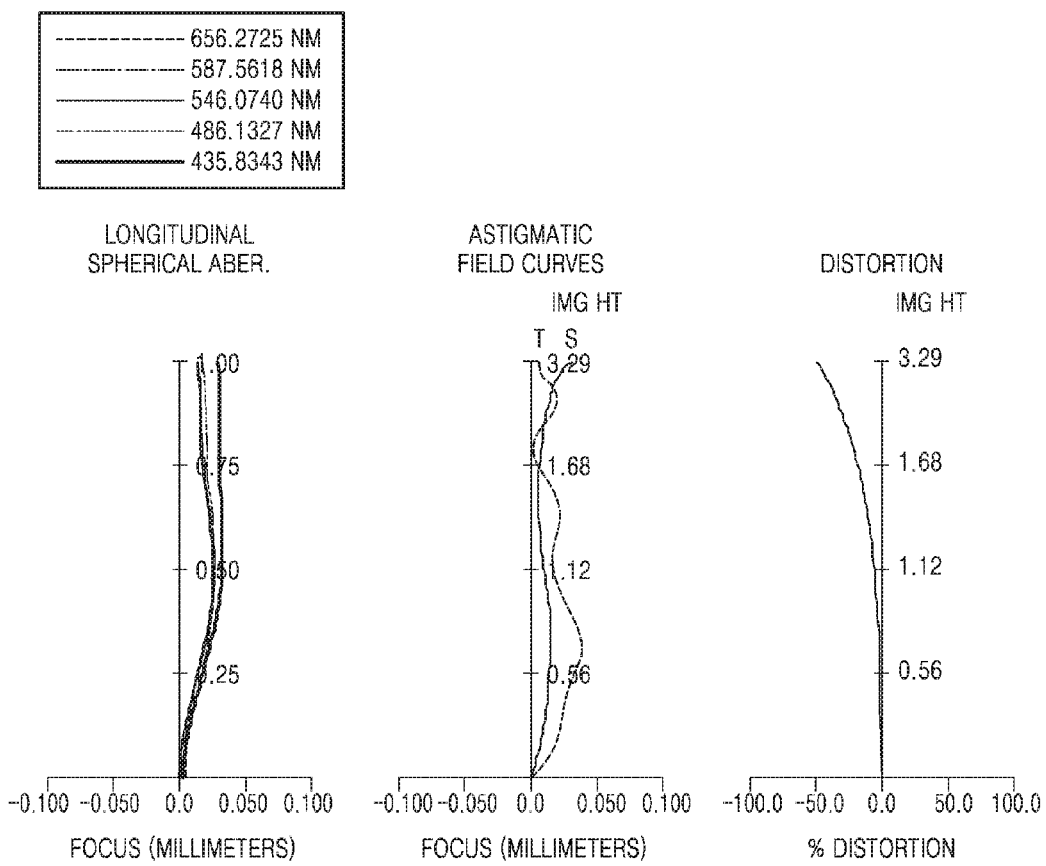
FIG. 4 illustrates a longitudinal spherical aberration, astigmatic field curves, and distortion of the photographic lens according to the embodiment of FIG. 3.

FIG. 4 illustrates a longitudinal spherical aberration, astigmatic field curves, and distortion of the photographic lens 2000 according to Embodiment 2.

Embodiment 3

Figure 5:
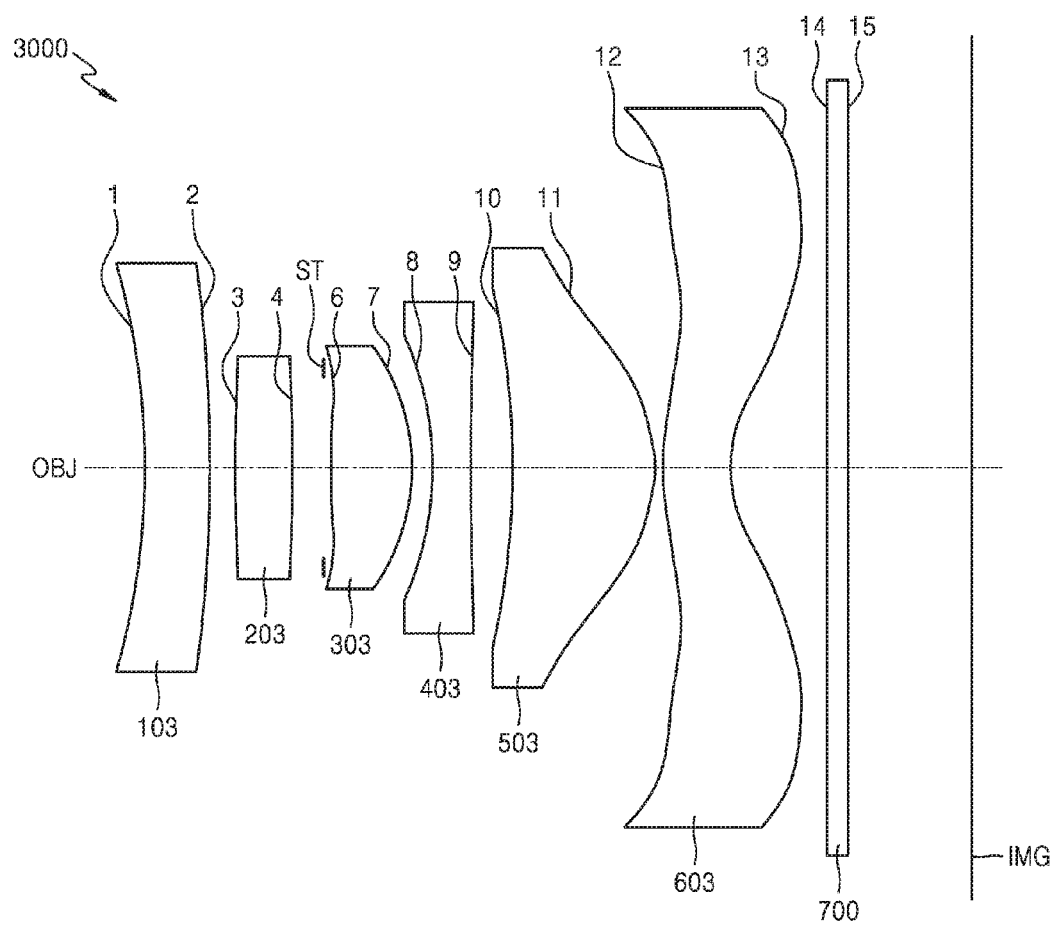
FIG. 5 is a cross-sectional view illustrating an optical arrangement of a photographic lens according to another embodiment.

FIG. 5 illustrates an optical arrangement of a photographic lens 3000 according to Embodiment 3.

Referring to FIG. 5, the photographic lens 3000 includes a first lens 103 having negative refractive power, a second lens 203 having positive refractive power, a third lens 303 having positive refractive power, a fourth lens 403 having negative refractive power, a fifth lens 503 having positive refractive power, and a sixth lens 603 having negative refractive power, which are sequentially arranged in a direction from the object OBJ to the image plane IMG.

Lens data according to Embodiment 3 is as follows.

TABLE 5

FNo. = 2.4/f = 2.0587 mm

| Surface | R | T | Nd | Vd |
|---|---|---|---|---|
| 1* | −1.8542 | 0.35 | 1.547 | 56.071 |
| 2* | −4.2334 | 0.1226 | | |
| 3* | 2.9153 | 0.3 | 1.587 | 35.09 |
| 4* | 14.155 | 0.1572 | | |
| ST | Infinity | 0.0462 | | |
| 6* | 5.273 | 0.4215 | 1.547 | 56.071 |
| 7* | −1.4293 | 0.1009 | | |
| 8* | −4.7357 | 0.2 | 1.658 | 21.521 |
| 9* | 3.3134 | 0.2216 | | |
| 10* | −3.1376 | 0.7333 | 1.547 | 56.071 |
| 11* | −0.6929 | 0.0467 | | |
| 12* | 1.1899 | 0.35 | 1.538 | 55.801 |
| 13* | 0.5012 | 0.5 | | |

TABLE 5-continued

FNo. = 2.4/f = 2.0587 mm

| Surface | R | T | Nd | Vd |
|---|---|---|---|---|
| 14 | Infinity | 0.11 | | |
| 15 | Infinity | 0.6266 | | |
| Image | Infinity | 0.0134 | | |

Table 6 below shows an aspherical coefficient.

TABLE 6

| Surface | K | A | B | C | D |
|---|---|---|---|---|---|
| 1 | −13.8794 | 0.0734 | −0.0621 | 0.0356 | −0.0106 |
| 2 | −161.055 | 0.1084 | −0.1299 | 0.022 | 0.1211 |
| 3 | −18.0329 | −0.1281 | −0.6616 | 0.9176 | −0.2615 |
| 4 | −364.6797 | −0.3015 | −0.0627 | −0.3804 | 3.0666 |
| 5 | 69.6713 | −0.209 | −0.5693 | 0.197 | −3.6454 |
| 6 | −11.2462 | −0.5651 | −0.437 | 1.2403 | −1.9586 |
| 7 | 34.8331 | −0.3289 | −1.3568 | 3.5877 | −1.4823 |
| 8 | 4.774 | −0.2502 | −0.3407 | 1.1122 | −1.3084 |
| 9 | −4.9483 | 0.1285 | −0.0779 | 0.0795 | 0.0648 |
| 10 | −0.7923 | 0.4626 | −0.4761 | 0.4229 | −0.0632 |
| 11 | −15.6051 | −0.1581 | 0.0404 | 0.006 | −0.0017 |
| 12 | −3.8756 | −0.1732 | 0.1036 | −0.0457 | 0.011 |

Figure 6:
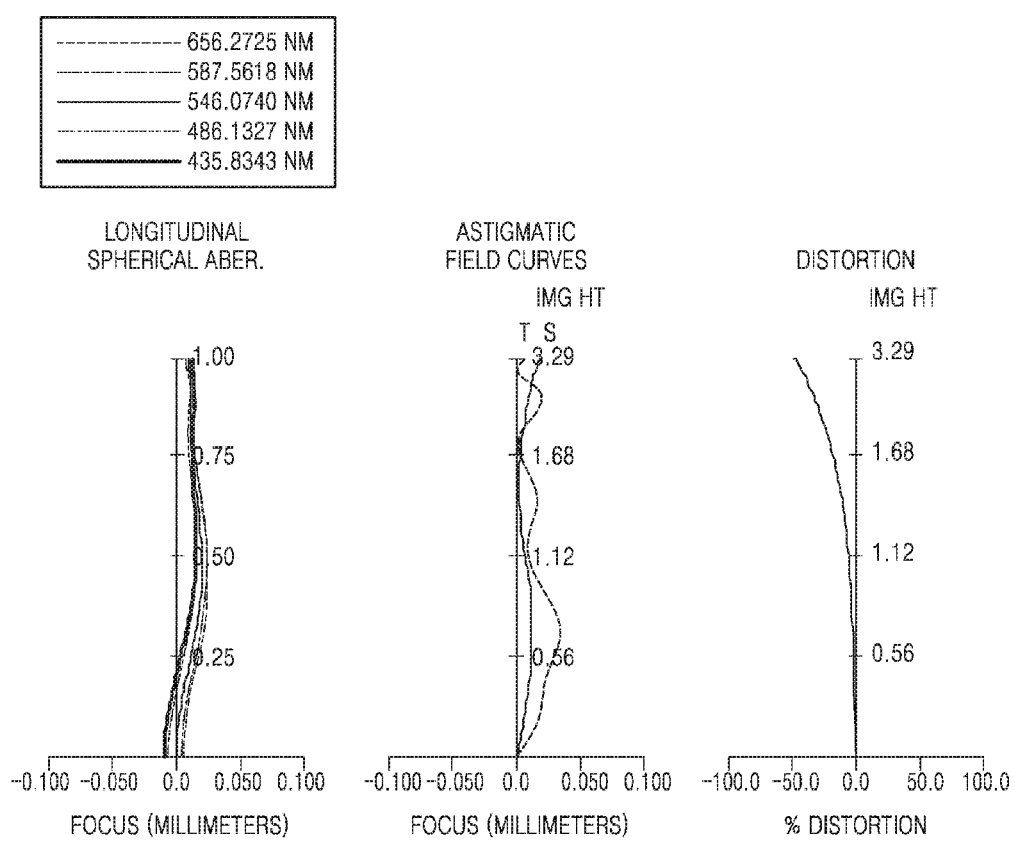
FIG. 6 illustrates a longitudinal spherical aberration, astigmatic field curves, and distortion of the photographic lens according to the embodiment of FIG. 5.

FIG. 6 illustrates a longitudinal spherical aberration, astigmatic field curves, and distortion of the photographic lens 3000 according to Embodiment 3.

Embodiment 4

Figure 7:
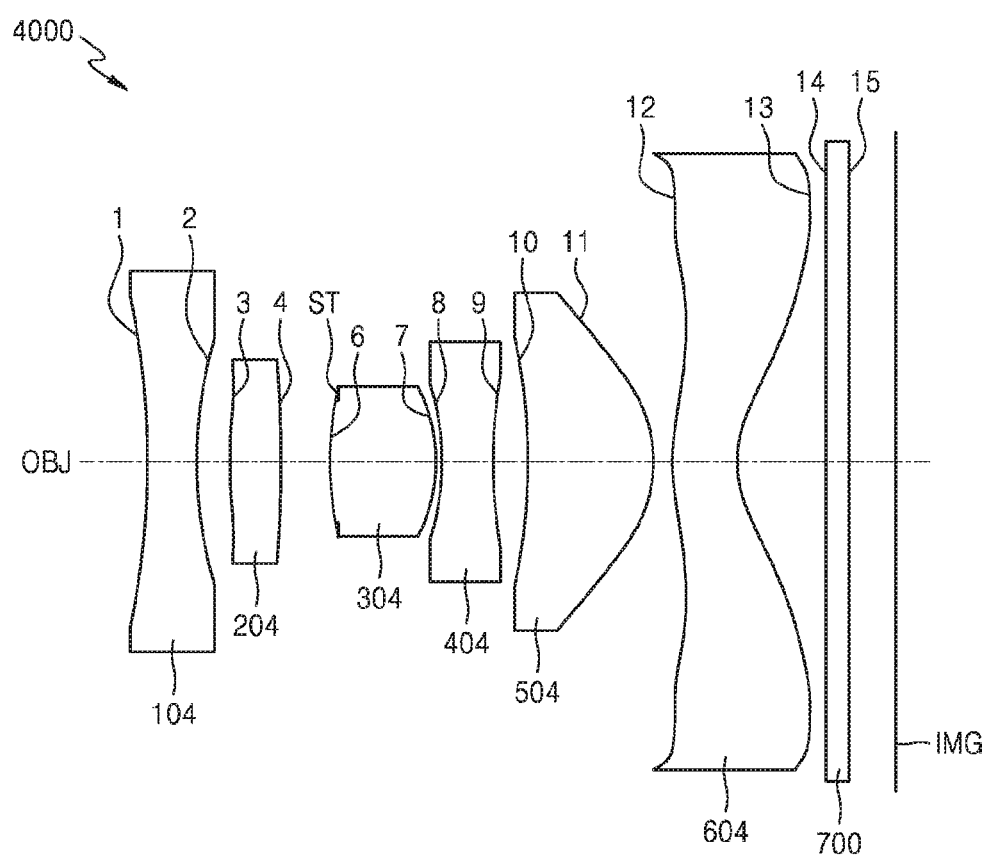
FIG. 7 is a cross-sectional view illustrating an optical arrangement of a photographic lens according to another embodiment.

FIG. 7 illustrates an optical arrangement of a photographic lens 4000 according to Embodiment 4.

Figure 9:
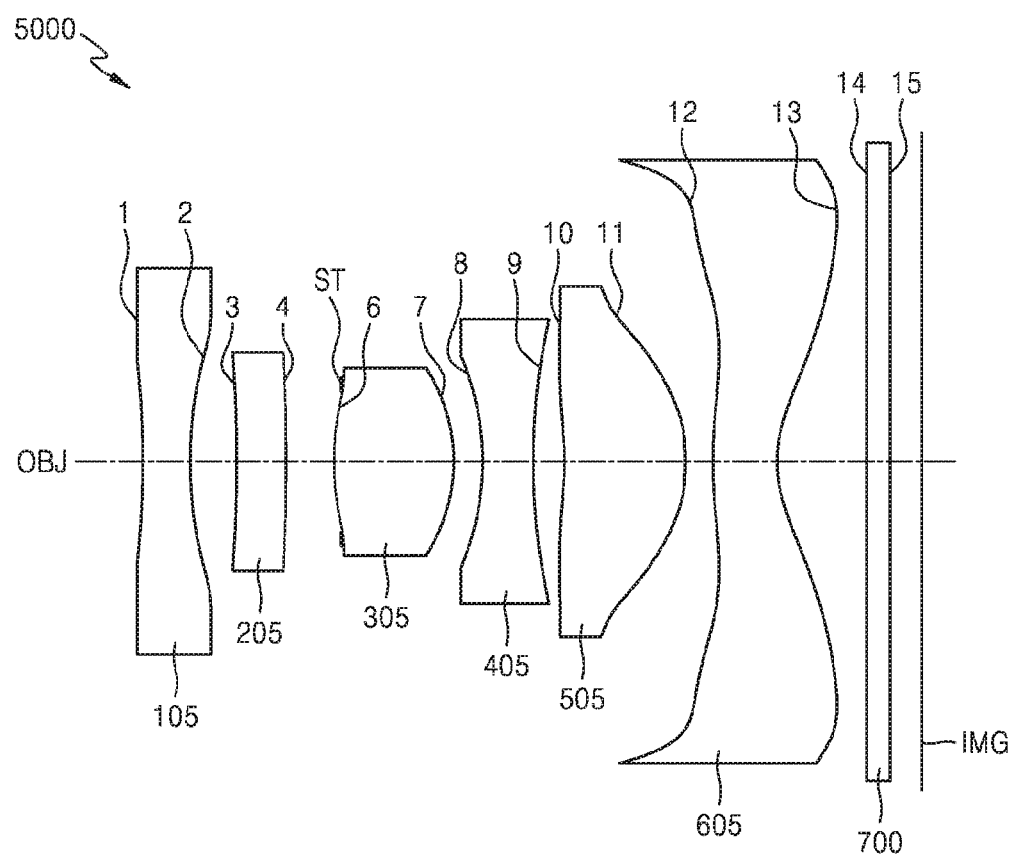
FIG. 9 is a cross-sectional view illustrating an optical arrangement of a photographic lens according to another embodiment.

Referring to FIG. 9, the photographic lens 4000 includes a first lens 104 having negative refractive power, a second lens 204 having positive refractive power, a third lens 304 having positive refractive power, a fourth lens 404 having negative refractive power, a fifth lens 504 having positive refractive power, and a sixth lens 604 having negative refractive power, which are sequentially arranged in a direction from the object OBJ to the image plane IMG.

Lens data according to Embodiment 4 is as follows.

TABLE 7

FNo. = 2.8/f = 1.3495 mm

| Surface | R | T | Nd | Vd |
|---|---|---|---|---|
| 1* | −1.7361 | 0.2372 | 1.546 | 56.093 |
| 2* | 3.0957 | 0.1573 | | |
| 3* | 2.3547 | 0.2437 | 1.646 | 23.517 |
| 4* | −29.4371 | 0.2641 | | |
| ST | Infinity | −0.0364 | | |
| 6* | 1.7218 | 0.4963 | 1.546 | 56.093 |
| 7* | −0.8807 | 0.0301 | | |
| 8* | −3.728 | 0.2436 | 1.646 | 23.517 |
| 9* | 1.7673 | 0.1615 | | |
| 10* | −2.0365 | 0.5945 | 1.546 | 56.093 |
| 11* | −0.5536 | 0.0915 | | |
| 12* | 1.1104 | 0.3085 | 1.546 | 56.093 |
| 13* | 0.4474 | 0.4193 | | |
| 14 | Infinity | 0.11 | | |
| 15 | Infinity | 0.216 | | |
| Image | Infinity | −0.001 | | |

Table 6 below shows an aspherical coefficient.

TABLE 8

| Surface | K | A | B | C | D |
|---|---|---|---|---|---|
| 1 | −20.5778 | 0.1449 | −0.1383 | 0.1236 | −0.0572 |
| 2 | 0 | 0.39 | −0.708 | 0.4942 | 1.7795 |
| 3 | −43.6643 | −0.1427 | −1.6768 | 1.89 | −3.1022 |
| 4 | 0 | −0.291 | −0.4522 | −4.0749 | 21.5867 |
| 5 | 9.4174 | −0.1078 | −2.5715 | 10.7553 | −74.3918 |
| 6 | −4.9768 | −1.0748 | −1.4022 | 8.3297 | −27.2625 |
| 7 | 37.7309 | −1.1886 | −3.4624 | 13.3929 | −17.1744 |
| 8 | 2.0801 | −0.6105 | −0.5799 | 3.8843 | −6.8727 |
| 9 | −14.6766 | 0.2191 | −0.2248 | −0.4944 | 0.4128 |
| 10 | −0.7903 | 0.674 | −1.0125 | 1.3161 | −0.3817 |
| 11 | −15.9941 | −0.2793 | 0.0695 | 0.0656 | −0.0108 |
| 12 | −3.7691 | −0.2643 | 0.2409 | −0.156 | 0.0574 |

Figure 8:
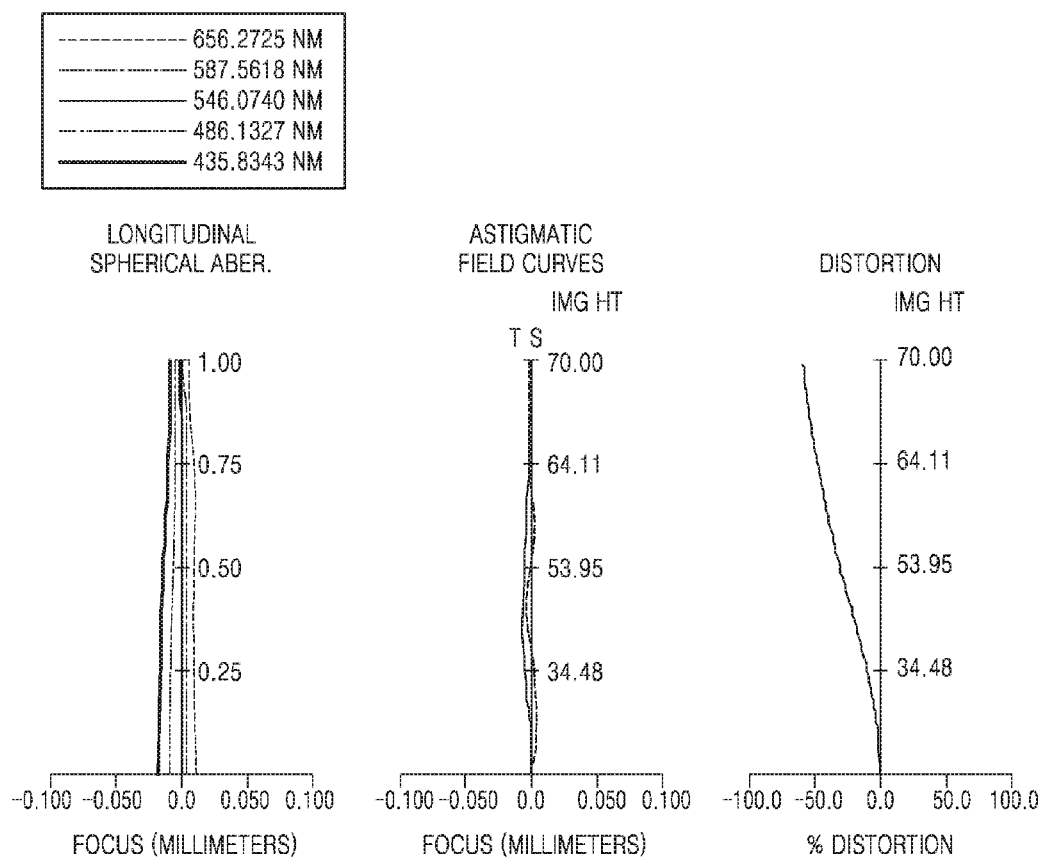
FIG. 8 illustrates a longitudinal spherical aberration, astigmatic field curves, and distortion of the photographic lens according to the embodiment of FIG. 7.

FIG. 8 illustrates a longitudinal spherical aberration, astigmatic field curves, and distortion of the photographic lens 4000 according to Embodiment 4.

Embodiment 5

FIG. 9 illustrates an optical arrangement of a photographic lens 5000 according to Embodiment 5.

Referring to FIG. 5, the photographic lens 5000 includes a first lens 105 having negative refractive power, a second lens 205 having negative refractive power, a third lens 305 having positive refractive power, a fourth lens 405 having negative refractive power, a fifth lens 505 having positive refractive power, and a sixth lens 605 having negative refractive power, which are sequentially arranged in a direction from the object OBJ to the image plane IMG.

Lens data according to Embodiment 5 is as follows.

TABLE 9

FNo. = 2.8/f = 1.4572 mm

| Surface | R | T | Nd | Vd |
|---|---|---|---|---|
| 1* | −3.4951 | 0.22 | 1.546 | 56.093 |
| 2* | 3.1615 | 0.2183 | | |
| 3* | 10.4374 | 0.23 | 1.646 | 23.517 |
| 4* | 7.8188 | 0.2636 | | |
| ST | Infinity | −0.0354 | | |
| 6* | 1.253 | 0.5519 | 1.546 | 56.093 |
| 7* | −0.8153 | 0.1382 | | |
| 8* | −3.9162 | 0.2358 | 1.646 | 23.517 |
| 9* | 1.518 | 0.1387 | | |
| 10* | −2.902 | 0.5683 | 1.546 | 56.093 |
| 11* | −0.597 | 0.122 | | |
| 12* | 1.5638 | 0.3 | 1.546 | 56.093 |
| 13* | 0.4951 | 0.4193 | | |
| 14 | Infinity | 0.11 | | |
| 15 | Infinity | 0.1417 | | |
| Image | Infinity | 0.0025 | | |

Table 10 below shows an aspherical coefficient.

TABLE 10

| Surface | K | A | B | C | D |
|---|---|---|---|---|---|
| 1 | −80.3668 | 0.1529 | −0.1862 | 0.1169 | −0.0261 |
| 2 | 0 | 0.5533 | −0.6192 | 0.2104 | 0.6734 |
| 3 | −1503.7848 | −0.053 | −1.3219 | 1.371 | −6.9362 |
| 4 | 0 | −0.3563 | −0.545 | −3.4706 | 17.979 |
| 5 | 5.0649 | −0.7239 | −2.4972 | 2.8555 | −82.7358 |
| 6 | −4.5786 | −0.9866 | −1.4118 | 6.3387 | −27.6194 |
| 7 | −36.4266 | −1.0096 | −3.3123 | 10.56 | −16.9176 |
| 8 | 1.828 | −0.596 | −0.5814 | 3.7862 | −7.0667 |

TABLE 10-continued

| Surface | K | A | B | C | D |
|---|---|---|---|---|---|
| 9 | −11.1589 | 0.3032 | −0.1209 | −0.4477 | 0.4078 |
| 10 | −0.7773 | 0.6512 | −1.0378 | 1.3466 | −0.2961 |
| 11 | −41.4454 | −0.3791 | 0.1379 | 0.0871 | −0.0153 |
| 12 | −4.291 | −0.3004 | 0.279 | −0.1859 | 0.0688 |

Figure 10:
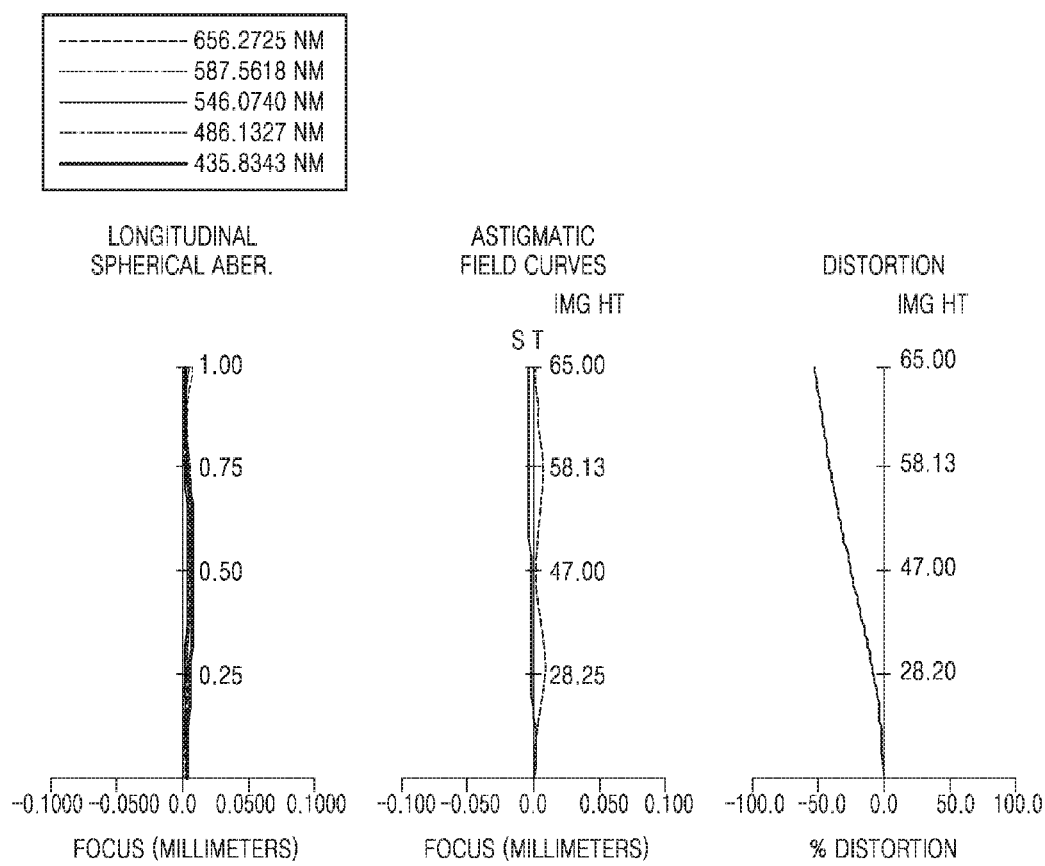
FIG. 10 illustrates a longitudinal spherical aberration, astigmatic field curves, and distortion of the photographic lens according to the embodiment of FIG. 9.

FIG. 10 illustrates a longitudinal spherical aberration, astigmatic field curves, and distortion of the photographic lens 5000 according to Embodiment 5.

Embodiment 6

FIG. 11 illustrates an optical arrangement of a photographic lens 6000 according to Embodiment 6.

Referring to FIG. 11, the photographic lens 6000 includes a first lens 106 having positive refractive power, a second lens 206 having negative refractive power, a third lens 306 having positive refractive power, a fourth lens 406 having negative refractive power, a fifth lens 506 having positive refractive power, and a sixth lens 606 having negative refractive power, which are sequentially arranged in a direction from the object OBJ to the image plane IMG.

Lens data according to Embodiment 6 is as follows.

TABLE 11

| FNo. = 2.8/f = 1.5576 mm | | | | |
|---|---|---|---|---|
| Surface | R | T | Nd | Vd |
| 1* | −2.6252 | 0.4 | 1.546 | 56.093 |
| 2* | −2.7016 | 0.1186 | | |
| 3* | −2.7661 | 0.3607 | 1.646 | 23.517 |
| 4* | −3.1802 | 0.2277 | | |
| ST | Infinity | −0.0031 | | |
| 6* | 4.4697 | 0.4459 | 1.546 | 56.093 |
| 7* | −0.7361 | 0.0945 | | |
| 8* | −2.3625 | 0.2 | 1.646 | 23.517 |
| 9* | 2.1239 | 0.1033 | | |
| 10* | −3.4574 | 0.6175 | 1.546 | 56.093 |
| 11* | −0.6047 | 0.2117 | | |
| 12* | 3.7499 | 0.3 | 1.546 | 56.093 |
| 13* | 0.5505 | 0.4193 | | |
| 14 | Infinity | 0.11 | | |
| 15 | Infinity | 0.1032 | | |
| IMG | Infinity | −0.0032 | | |

Table 12 below shows an aspherical coefficient.

TABLE 12

| Surface | K | A | B | C | D |
|---|---|---|---|---|---|
| 1 | −6.933 | 0.2002 | −0.1784 | 0.0983 | −0.0426 |
| 2 | 0 | 0.645 | −0.8527 | 0.2562 | 0.9672 |
| 3 | −44.4863 | 0.0631 | −0.9253 | 1.9367 | −5.0807 |
| 4 | 0 | 0.0243 | −0.6872 | −0.9938 | 11.8539 |
| 5 | 11.4742 | −0.4645 | −3.1967 | 3.0955 | −103.7954 |
| 6 | −3.5765 | −1.1887 | −2.264 | 7.8103 | −29.9318 |
| 7 | −36.4849 | −1.1675 | −3.0201 | 15.2337 | −17.0418 |
| 8 | 3.4886 | −0.5031 | −0.4428 | 3.6697 | −7.2684 |
| 9 | −19.3034 | 0.304 | −0.1485 | −0.4623 | 0.4043 |
| 10 | −0.7539 | 0.6023 | −1.0562 | 1.4622 | −0.1755 |
| 11 | −462.7808 | −0.6904 | 0.3342 | 0.1408 | −0.0281 |
| 12 | −4.7282 | −0.3502 | 0.3336 | −0.2132 | 0.0686 |

Figure 12:
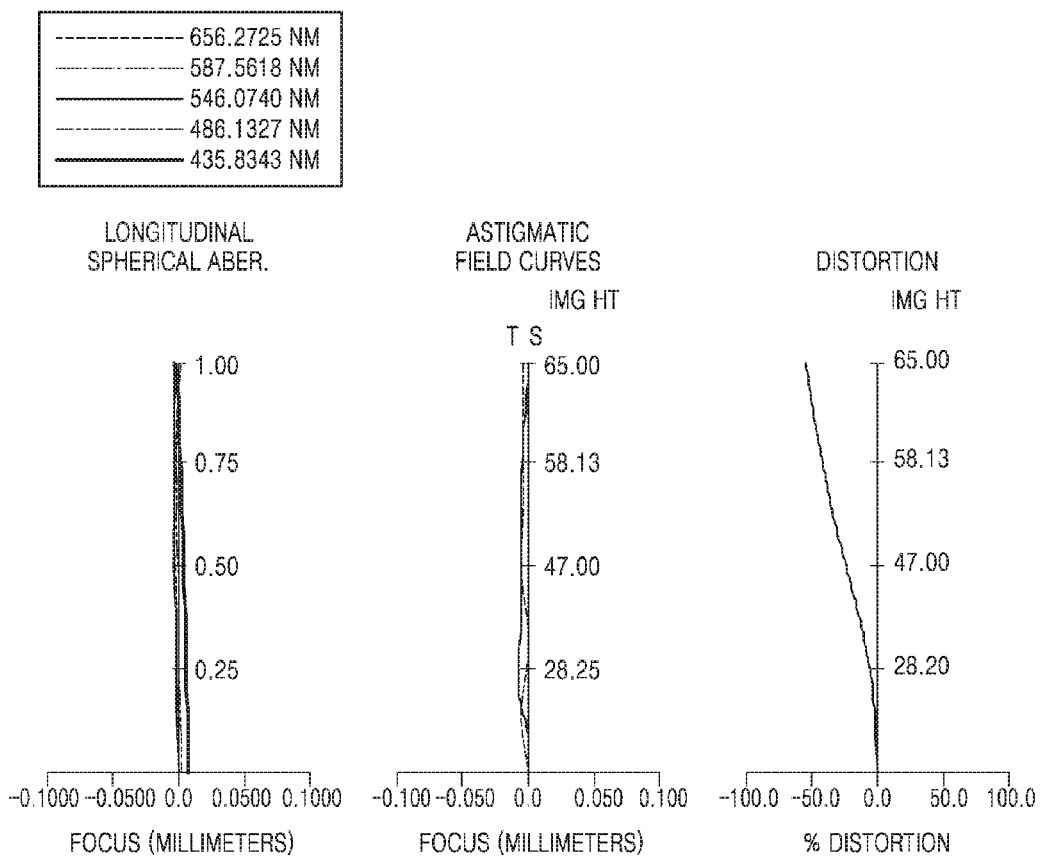
FIG. 12 illustrates a longitudinal spherical aberration, astigmatic field curves, and distortion of the photographic lens according to the embodiment of FIG. 11.

FIG. 12 illustrates a longitudinal spherical aberration, astigmatic field curves, and distortion of the photographic lens 6000 according to Embodiment 6.

Embodiment 7

FIG. 13 illustrates an optical arrangement of a photographic lens 7000 according to Embodiment 7.

Referring to FIG. 13, the photographic lens 7000 includes a first lens 107 having positive refractive power, a second lens 207 having positive refractive power, a third lens 307 having positive refractive power, a fourth lens 407 having negative refractive power, a fifth lens 507 having positive refractive power, and a sixth lens 607 having negative refractive power, which are sequentially arranged in a direction from the object OBJ to the image plane IMG.

Lens data according to Embodiment 7 is as follows.

TABLE 13

| FNo. = 2.8/f = 1.5440 mm | | | | |
|---|---|---|---|---|
| Surface | R | T | Nd | Vd |
| 1* | −2.5179 | 0.3988 | 1.546 | 56.093 |
| 2* | −2.5908 | 0.1145 | | |
| 3* | −2.801 | 0.3836 | 1.646 | 23.517 |
| 4* | −2.4875 | 0.1816 | | |
| 5* | Infinity | 0.0013 | | |
| 6* | 9.3373 | 0.4253 | 1.546 | 56.093 |
| 7* | −0.7325 | 0.072 | | |
| 8* | −2.4338 | 0.2 | 1.646 | 23.517 |
| 9* | 2.1339 | 0.1092 | | |
| 10* | −3.4147 | 0.6172 | 1.546 | 56.093 |
| 11* | −0.6012 | 0.2223 | | |
| 12* | 4.168 | 0.3 | 1.546 | 56.093 |
| 13* | 0.5587 | 0.4193 | | |
| 14 | Infinity | 0.11 | | |
| 15 | Infinity | 0.1038 | | |
| IMG | Infinity | −0.0038 | | |

Table 14 below shows an aspherical coefficient.

TABLE 14

| Surface | K | A | B | C | D |
|---|---|---|---|---|---|
| 1 | −6.8266 | 0.2004 | −0.1786 | 0.0993 | −0.0428 |
| 2 | 0 | 0.6432 | −0.8519 | 0.2531 | 0.9648 |
| 3 | −40.3463 | 0.0465 | −0.9299 | 1.9843 | −5.0733 |
| 4 | 0 | 0.0396 | −0.6868 | −1.0132 | 12.3089 |
| 5 | 151.8627 | −0.3788 | −3.2427 | 1.8658 | −93.5713 |
| 6 | −3.6099 | −1.1804 | −2.3365 | 6.9893 | −26.0123 |
| 7 | −42.154 | −1.1843 | −3.0898 | 15.1871 | −16.0047 |
| 8 | 3.4183 | −0.5029 | −0.4524 | 3.6536 | −7.3001 |
| 9 | −22.2619 | 0.3007 | −0.1581 | −0.4698 | 0.4086 |
| 10 | −0.7563 | 0.6022 | −1.0588 | 1.4543 | −0.1796 |
| 11 | −597.1241 | −0.6791 | 0.3277 | 0.1399 | −0.0269 |
| 12 | −4.7166 | −0.3463 | 0.3328 | −0.213 | 0.0674 |

Figure 14:
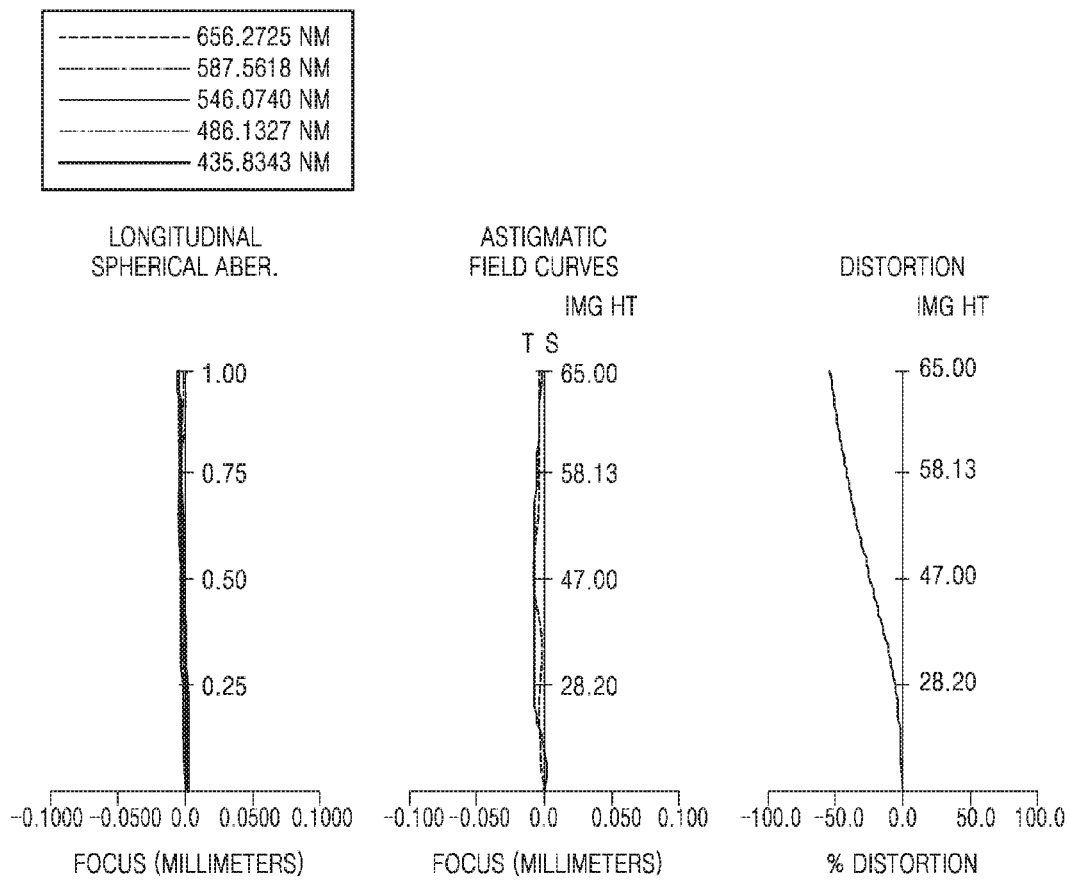
FIG. 14 illustrates a longitudinal spherical aberration, astigmatic field curves, and distortion of the photographic lens according to the embodiment of FIG. 13.

FIG. 14 illustrates a longitudinal spherical aberration, astigmatic field curves, and distortion of the photographic lens 7000 according to Embodiment 7.

Embodiment 8

Figure 15:
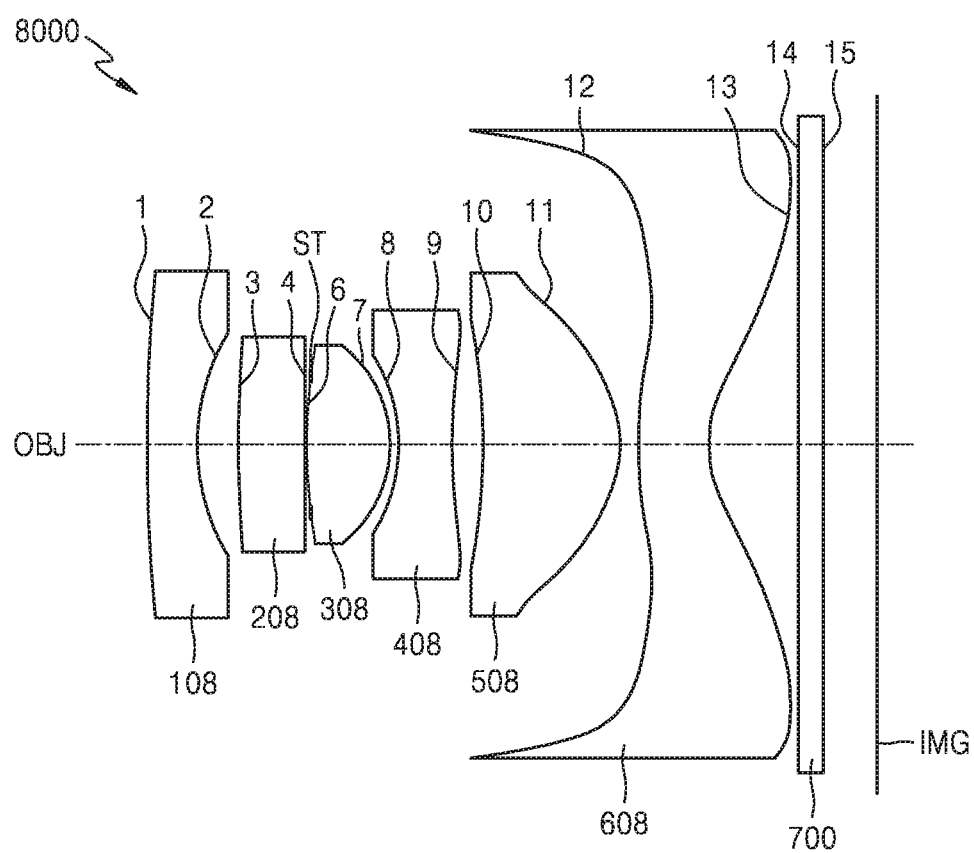
FIG. 15 is a cross-sectional view illustrating an optical arrangement of a photographic lens according to another embodiment.

FIG. 15 illustrates an optical arrangement of a photographic lens 8000 according to Embodiment 8.

Referring to FIG. 15, the photographic lens 8000 includes a first lens 108 having negative refractive power, a second lens 208 having positive refractive power, a third lens 308 having positive refractive power, a fourth lens 408 having negative refractive power, a fifth lens 508 having positive refractive power, and a sixth lens 608 having negative refractive power, which are sequentially arranged in a direction from the object OBJ to the image plane IMG.

Lens data according to Embodiment 8 is as follows.

TABLE 15

| FNo. = 2.8/f = 1.3985 mm | | | | |
|---|---|---|---|---|
| Surface | R | T | Nd | Vd |
| 1* | 50 | 0.2272 | 1.546 | 56.093 |
| 2* | 1.144 | 0.1979 | | |
| 3* | 2.3889 | 0.3069 | 1.646 | 23.517 |
| 4* | 27.7675 | 0.0279 | | |
| ST | Infinity | −0.0183 | | |
| 6* | 2.1245 | 0.3927 | 1.546 | 56.093 |
| 7* | −0.7271 | 0.0307 | | |
| 8* | −2.4003 | 0.2568 | 1.646 | 23.517 |
| 9* | 1.9471 | 0.1419 | | |
| 10* | −2.0675 | 0.6406 | 1.546 | 56.093 |
| 11* | −0.5381 | 0.0827 | | |
| 12* | 1.1327 | 0.3326 | 1.546 | 56.093 |
| 13* | 0.4342 | 0.4193 | | |
| 14 | Infinity | 0.11 | | |
| 15 | Infinity | 0.2459 | | |
| IMG | Infinity | 0.0032 | | |

Table 16 below shows an aspherical coefficient.

TABLE 16

| Surface | K | A | B | C | D |
|---|---|---|---|---|---|
| 1 | −33.2683 | 0.1538 | −0.2121 | 0.2073 | −0.0561 |
| 2 | 0 | 0.3919 | −0.144 | 1.7372 | −4.0464 |
| 3 | −31.5579 | −0.1439 | −1.0791 | −5.913 | 21.9926 |
| 4 | 0 | −0.476 | −2.372 | 18.6861 | 133.1698 |
| 5 | 8.3871 | −0.1646 | −3.623 | 23.1098 | −47.5225 |
| 6 | −2.5851 | −1.5921 | −2.9112 | 17.2962 | −90.6614 |
| 7 | 21.7123 | −1.7799 | −3.8691 | 8.4358 | −13.7596 |
| 8 | 2.6973 | −0.5757 | −0.5142 | 3.7063 | −7.4891 |
| 9 | −4.5849 | 0.2988 | −0.0471 | −0.6381 | −0.1107 |
| 10 | −0.7736 | 0.6361 | −1.0071 | 1.2052 | −0.4517 |
| 11 | −15.8182 | −0.2454 | −0.0015 | 0.0981 | −0.0115 |
| 12 | −3.5103 | −0.254 | 0.2249 | −0.1458 | 0.0567 |

Figure 16:
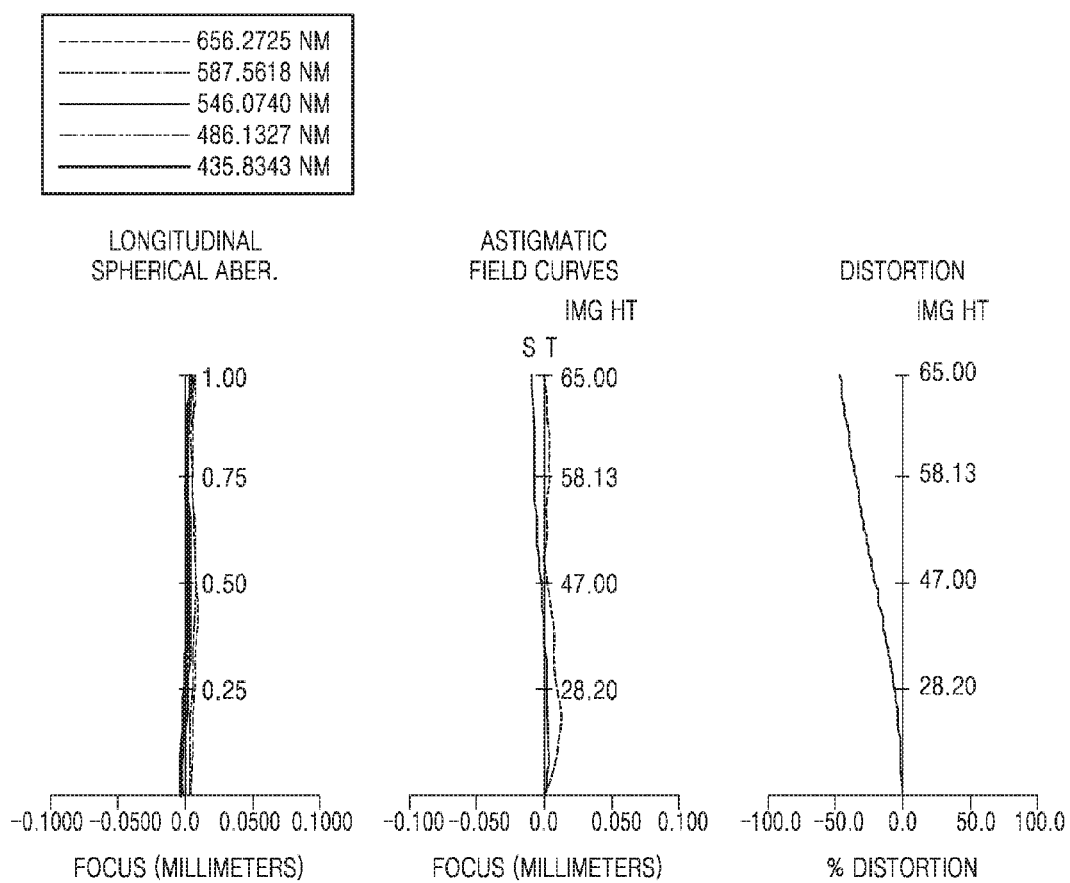
FIG. 16 illustrates a longitudinal spherical aberration, astigmatic field curves, and distortion of the photographic lens according to the embodiment of FIG. 15.

FIG. 16 illustrates a longitudinal spherical aberration, astigmatic field curves, and distortion of the photographic lens 8000 according to Embodiment 8.

Embodiment 9

Figure 17:
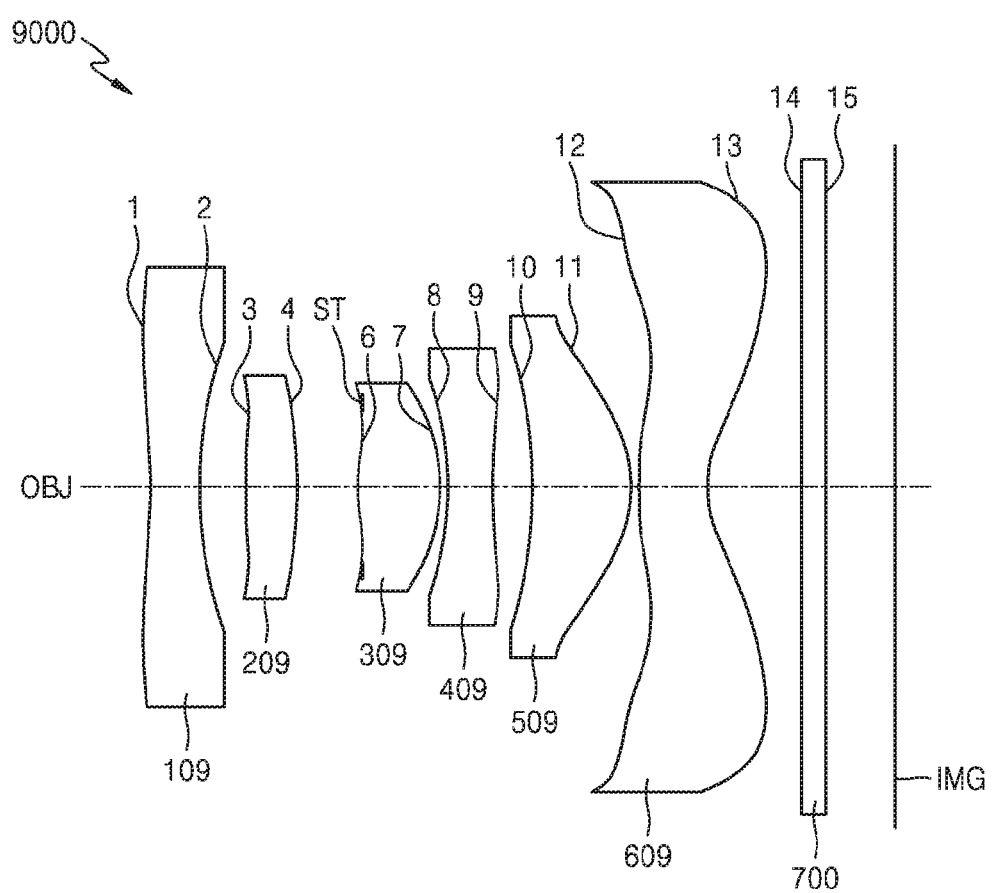
FIG. 17 is a cross-sectional view illustrating an optical arrangement of a photographic lens according to another embodiment.

FIG. 17 illustrates an optical arrangement of a photographic lens 9000 according to Embodiment 9.

Referring to FIG. 17, the photographic lens 9000 includes a first lens 109 having negative refractive power, a second lens 209 having positive refractive power, a third lens 309 having positive refractive power, a fourth lens 409 having negative refractive power, a fifth lens 509 having positive refractive power, and a sixth lens 609 having negative refractive power, which are sequentially arranged in a direction from the object OBJ to the image plane IMG.

Lens data according to Embodiment 9 is as follows.

TABLE 17

| FNo. = 2.4/f = 1.3457 mm | | | | |
|---|---|---|---|---|
| Surface | R | T | Nd | Vd |
| 1* | −2.7887 | 0.22 | 1.546 | 56.093 |
| 2* | 2.7759 | 0.2097 | | |
| 3* | 3.214 | 0.23 | 1.546 | 56.093 |
| 4* | −4.5054 | 0.2882 | | |
| ST | Infinity | −0.0147 | | |
| 6* | 2.8729 | 0.3639 | 1.546 | 56.093 |
| 7* | −1.0569 | 0.0306 | | |
| 8* | −12.2447 | 0.2 | 1.546 | 56.093 |
| 9* | 1.9365 | 0.1795 | | |
| 10* | −1.782 | 0.4401 | 1.546 | 56.093 |
| 11* | −0.5535 | 0.0342 | | |
| 12* | 1.041 | 0.3072 | 1.546 | 56.093 |
| 13* | 0.4406 | 0.4193 | | |
| 14 | Infinity | 0.11 | | |
| 15 | Infinity | 0.2983 | | |
| IMG | Infinity | 0.006 | | |

Table 18 below shows an aspherical coefficient.

TABLE 18

| Surface | K | A | B | C | D |
|---|---|---|---|---|---|
| 1 | −71.8375 | 0.1463 | −0.1474 | 0.126 | −0.0489 |
| 2 | 0 | 0.4212 | −0.7785 | 0.2985 | 1.679 |
| 3 | −121.0671 | −0.2503 | −1.8791 | 1.7935 | −2.4983 |
| 4 | 0 | −0.4184 | −0.3765 | −4.1617 | 21.1524 |
| 5 | 8.0349 | −0.1487 | −2.6378 | 11.045 | −87.2303 |
| 6 | −5.9514 | −1.0143 | −1.7942 | 6.1175 | −28.5796 |
| 7 | 1.1476 | −1.1172 | −3.2707 | 14.7793 | −15.9398 |
| 8 | 0.9191 | −0.6565 | −0.6668 | 3.6968 | −6.6846 |
| 9 | −7.6207 | 0.2199 | −0.2808 | −0.6346 | 0.1135 |
| 10 | −0.8516 | 0.7165 | −0.86841 | 1.4862 | −0.2551 |
| 11 | −17.2936 | −0.4021 | 0.0912 | 0.0907 | −0.0028 |
| 12 | −4.1791 | −0.3262 | 0.2779 | −0.1775 | 0.0597 |

Figure 18:
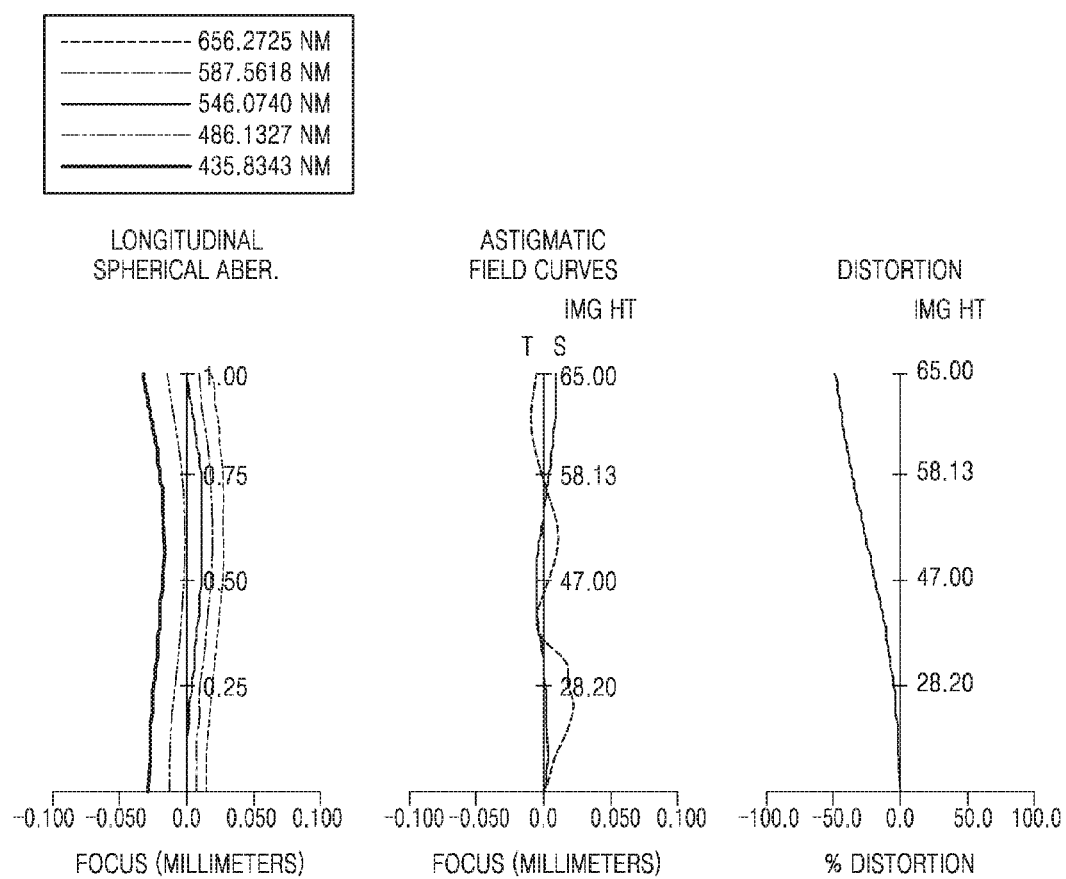
FIG. 18 illustrates a longitudinal spherical aberration, astigmatic field curves, and distortion of the photographic lens according to the embodiment of FIG. 17.

FIG. 18 illustrates a longitudinal spherical aberration, astigmatic field curves, and distortion of the photographic lens 9000 according to Embodiment 9.

Table 19 below shows that the photographic lenses 1000-9000 according to Embodiments 1-9 meet Conditions (1), (2), (3), and (4).

TABLE 19

| | Condition (1) | Condition (2) | | | Condition (3) | | | Condition (4) |
|---|---|---|---|---|---|---|---|---|
| Classification | FOV | D1 | D6 | D1/D6 | F1 | F2 | \|F1/F2\| | Ind2 |
| Embodiment 1 | 131.47 | 1.84 | 3.06 | 0.6 | −2.35 | 3.79 | 0.62 | 1.65 |
| Embodiment 2 | 128.96 | 2.1 | 3.7 | 0.57 | −9.17 | 9.46 | 0.97 | 1.55 |
| Embodiment 3 | 128.81 | 2.12 | 3.73 | 0.57 | −6.36 | 6.19 | 1.03 | 1.59 |
| Embodiment 4 | 156 | 1.79 | 2.91 | 0.62 | −2 | 3.39 | 0.59 | 1.65 |
| Embodiment 5 | 138 | 1.78 | 2.78 | 0.64 | −3 | −50 | 0.06 | 1.65 |
| Embodiment 6 | 138 | 2.16 | 2.82 | 0.77 | 200 | −50 | 4 | 1.65 |
| Embodiment 7 | 138 | 2.09 | 2.8 | 0.75 | 175.6 | 23.26 | 7.55 | 1.65 |

TABLE 19-continued

| Classification | Condition (1) FOV | Condition (2) | | | Condition (3) | | | Condition (4) |
| --- | --- | --- | --- | --- | --- | --- | --- | --- |
| | | D1 | D6 | D1/D6 | F1 | F2 | |F1/F2| | Ind2 |
| Embodiment 8 | 132 | 1.61 | 2.92 | 0.55 | −2.14 | 4.02 | 0.53 | 1.65 |
| Embodiment 9 | 138 | 1.95 | 2.71 | 0.72 | −2.51 | 3.47 | 0.72 | 1.55 |

The above-described embodiments provide photographic lenses having compact and light structures and achieving smooth aberration correction and a super wide angle.

Photographic lenses according to embodiments may be applied to various types of photographic apparatuses, together with image sensors which convert optical images formed via the photographic lenses into electrical signals. The photographic apparatuses may be employed in various electronic apparatuses, for example, mobile terminals, door phones, and cars.

Figure 19:
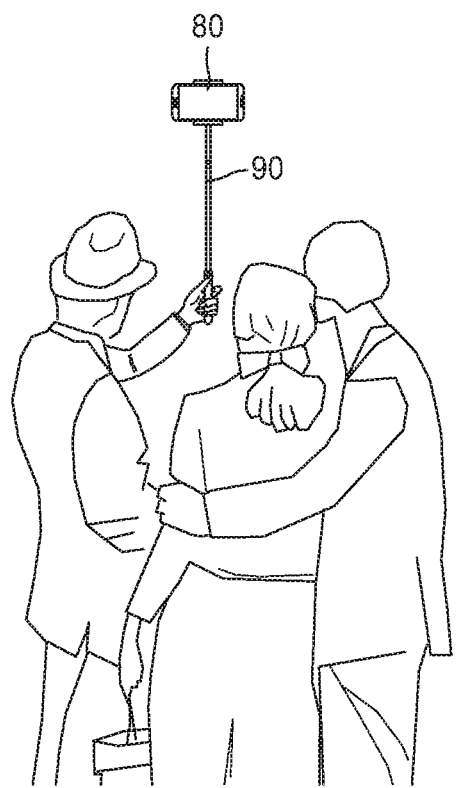
FIGS. 19 and 20 illustrate photography in a self camera mode when a photographic lens according to a comparative example has been applied to a mobile phone camera and photography in a self camera mode when a photographic lens according to an embodiment has been applied to a mobile phone camera, respectively.
Figure 20:

FIGS. 19 and 20 illustrate photography in a self camera mode when a photographic lens according to a comparative example has been applied to a mobile phone camera 80 and photography in a self camera mode when a photographic lens according to an embodiment has been applied to a mobile phone camera 10000, respectively.

In FIG. 19, the mobile phone camera 80 uses a general photographic lens. The general photographic lens denotes a photographic lens that provides an optical performance of an FOV range of 60° to 90° in which a typical mobile phone is mounted. When several people try to take pictures in a self camera photographing mode by using the mobile phone camera 80, an auxiliary apparatus 90 for self cameras, so called "selfie stick", is used to put several people on a single screen in a self camera mode.

In FIG. 20, the mobile phone camera 10000 uses a photographic lens that achieves a super wide angle, according to the requirements suggested in the above-described embodiments. In this case, as shown in FIG. 20, many people are able to take pictures in a self camera mode without using an auxiliary apparatus for self cameras.

The photographic lens facilitates aberration correction by using six lenses, and has a compact and light structure.

The photographic lens includes an aspherical lens formed of a plastic material, and thus produces a cost-effective and high-performance optical system.

Since the photographic lens is compact and at the same time achieves a super wide angle, when the photographic lens is applied to mobile phone cameras, photography may be easily performed in a self camera mode.

It should be understood that the exemplary embodiments described therein should be considered in a descriptive sense only and not for purposes of limitation. Descriptions of features or aspects within each embodiment should typically be considered as available for other similar features or aspects in other embodiments.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A photographic lens comprising, in a sequence from an object to an image plane:
   a first lens having negative refractive power;
   a second lens having positive refractive power;
   a third lens having positive refractive power;
   a fourth lens having negative refractive power;
   a fifth lens having positive refractive power; and
   a sixth lens having negative refractive power;
   wherein the zoom lens satisfies the following condition:

$$90° < FOV < 160°$$

$$0.5 < D1/D6 < 0.77$$

where FOV is a field of view of the photographic lens, D1 is an effective aperture of the first lens, and D6 is an effective aperture of the sixth lens.

2. The photographic lens of claim 1, wherein the photographic lens satisfies the following condition:

$$0.0 < |F1/F2| < 10.0$$

where F1 and F2 are a focal length of the first lens and a focal length of the second lens, respectively.

3. The photographic lens of claim 1, wherein the photographic lens satisfies the following condition:

$$1.5 < Ind2 < 1.7$$

where Ind2 is a refractive index of the second lens.

4. The photographic lens of claim 1, wherein the photographic lens satisfies the following condition:

$$125° < FOV < 160°$$

where FOV is a field of view of the photographic lens.

5. The photographic lens of claim 1, wherein the photographic lens satisfies the following condition:

$$0 < |F1/F2| < 1.5$$

where F1 and F2 are a focal length of the first lens and a focal length of the second lens, respectively.

6. A photographic apparatus comprising:
   the photographic lens of claim 1; and
   an image sensor configured to convert an optical image formed by the photographic lens into an electrical signal.

* * * * *